United States Patent [19]

Kohzai et al.

[11] 4,220,882
[45] Sep. 2, 1980

[54] DIRECT CURRENT MOTOR

[75] Inventors: Yoshinori Kohzai, Hino; Shigeaki Oyama, Hachioji, both of Japan

[73] Assignee: Fujitsu Fanuc Limited, Japan

[21] Appl. No.: 884,586

[22] Filed: Mar. 8, 1978

[30] Foreign Application Priority Data

Apr. 12, 1977 [JP] Japan ................................ 52/40953

[51] Int. Cl.$^2$ ............................................. H02K 1/10
[52] U.S. Cl. ................................... 310/186; 310/224
[58] Field of Search ............... 310/186, 190, 191, 192, 310/193, 216–218, 220–225

[56] References Cited

U.S. PATENT DOCUMENTS

| | | | |
|---|---|---|---|
| 665,586 | 1/1901 | Siemens et al. | 310/224 |
| 688,340 | 12/1901 | Roth | 310/224 |
| 1,523,004 | 1/1925 | Doherty | 310/224 |
| 3,296,472 | 1/1967 | Fisher | 310/186 |
| 3,441,760 | 4/1969 | Collens | 310/186 X |
| 3,445,702 | 5/1969 | Silva | 310/186 X |

*Primary Examiner*—Donovan F. Duggan
*Attorney, Agent, or Firm*—Staas & Halsey

[57] ABSTRACT

A direct current motor having interpoles mounted therein. The motor comprises a circular-shaped yoke, two main magnetic poles equidistantly disposed inside of the yoke and with their polarities different from each other, an armature, having armature windings wound thereon, which is actuated by an electromotive force caused by the main magnetic poles and which is rotated in the magnetic field generated by the main magnetic poles, and interpoles which are disposed at positions located between the two main magnetic poles so as to face the armature windings. Each of the interpoles comprises three small poles which are disposed inside of the yoke and are magnetically insulated from the yoke. As a result of this construction magnetic circuits are formed between the adjacent two small poles of each interpole and the armature.

6 Claims, 3 Drawing Figures

DIRECT CURRENT MOTOR

BACKGROUND OF THE INVENTION

This invention relates to an improved direct current motor having interpoles mounted therein.

Known is a direct current motor in which a counter electromotive force is induced in armature windings located within a commutating zone due to the rotation of an armature within a main magnetic field. A spark is generated between a commutator and a brush and in some cases between two brushes, due to the counter electromotive force in the armature windings. It is also well known to dispose interpoles within the direct current motor for providing a compensating magnetic field interlinked with the armature windings so that the above-mentioned counter electromotive force is eliminated and the generation of the spark obviated. In such a direct current motor, it is necessary to select the magnetic characteristics of the interpoles so that the compensating magnetic field generated by the interpoles and interlinked with the armature windings within the commutating zone can generate a compensating electromotive force which is effectively the same as the counter electromotive force generated in the armature windings.

When the magnetic characteristics of the interpoles are selected in the manner as mentioned above, it should be noted that the interpoles are passed by magnetic flux generated by not only a magnetic field caused by the interpoles per se, but also magnetic flux generated by a magnetic field (a magnetic field caused by the armature reaction) which is induced by the armature current and the direction of which is opposite to that of the magnetic field by the interpoles per se. As a result, the electromotive force of the interpoles is reduced.

Considering the above-mentioned background, it can be concluded that, to fully achieve the advantages of the interpoles, the magnetomotive force of the interpoles must be selected to be a value which is the sum of: (A) the compensating magnetomotive force which can generate the counter electromotive force equal to the electromotive force induced in the armature windings, and; (B) the magnetomotive force which can eliminate the magnetic field caused by the armature reaction. A conventional direct current motor which can satisfy the above-mentioned requirement requires large interpoles having a large cross sectional area. Accordingly, this type of conventional motor generates a large amount of heat and various operating characteristics of the motor are decreased.

BRIEF SUMMARY OF THE INVENTION

An object of the present invention is to provide an improved, novel direct current motor in which interpoles are disposed on a yoke but magnetically insulated therefrom, and in which motor, the magnetic flux generated by the magnetic field caused by the armature reaction is prevented from circulating through yoke. The magnetomotive force required by the interpoles can therefore be decreased, and accordingly, the size of the interpoles can be compact, the amount of heat generated by the motor can be reduced and the operating characteristics of the motor can be maintained at a high level.

Another object of the present invention is to provide an improved novel direct current motor in which a yoke is provided with interpoles comprising at least two small poles, the polarities of the adjacent two small poles being selected to be different from each other, the small poles are disposed on the yoke in a predetermined direction and are magnetically insulated from the yoke, whereby magnetic circuits are formed between the adjacent two small poles and the armature. Accordingly, the size of the interpoles can be smaller than that of a conventional motor, the amount of the heat generated by the motor can be lowered and the operating characteristics of the motor can be improved.

A further object of the present invention is to provide an improved and novel direct current motor in which a yoke is formed in a circular shape and is provided with interpoles, each of which comprises a main small pole and two auxiliary small poles, whereby two magnetic circuits, the direction of which are different from each other, are formed among one of the auxiliary small poles, the main small pole and the armature.

Further features and advantages of the present invention will become apparent from the detailed description set forth below with reference to the accompanying drawings.

DETAILED DESCRIPTION OF THE INVENTION

PRIOR ART

Figure 1:
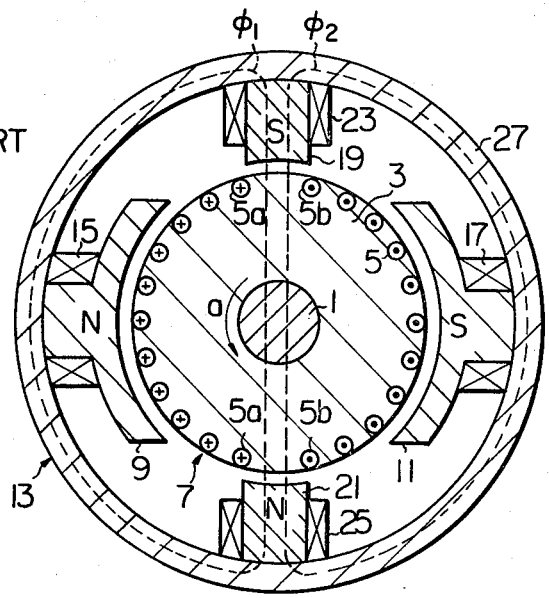
FIG. 1 is a cross sectional elevational view which illustrates a conventional direct current motor.

With reference to the accompanying FIG. 1, a rotor 7 comprises a rotatable shaft 1 rotatably mounted via bearings (not shown), an armature 3 fixed to the rotatable shaft 1 and armature windings 5 wound around the armature 3. A stator 13 comprises a yoke 27 having a circular shape, and two main magnetic poles 9 and 11 equidistantly spaced around the inner circumference of the yoke 27 and located outside of the armature. The main magnetic poles 9 and 11 have field windings 15 and 17 wound thereon, respectively, so that the polarities thereof are selected to be different from each other. The field windings 15 and 17 are supplied with electric current flowing in the directions shown in FIG. 1. As a result, the armature 3 is rotated counterclockwise as shown by arrow a. Some of the armature windings 5a and 5b, which are located between the main magnetic poles 9 and 11, are within a commutating zone.

Interpoles 19 and 21, which have interpole windings 23 and 25 wound thereon, respectively, are disposed at positions between the main magnetic poles 9 and 11, respectively, so as to eliminate the counter electromotive force induced in the armature windings 5a and 5b, and generate a predetermined magnetic field which can interlink with the armature windings 5a and 5b located within the commutating zone. The polarities of the interpoles 19 and 21 are selected to be different from those main magnetic poles 9 and 11, respectively, which are located at the leading positions of the interpoles 19 and 21 with regard to the rotating direction of the armature 3. When the direction of the armature current flow is altered, it is necessary to simultaneously alter the direction of the current flowing in the interpole windings 23 and 25. The magnetic field generated by the interpoles 19 and 21 interlinks with the armature windings 5a and 5b within the commutating zone and generates an electromotive force which can eliminate the counter electromotive force induced in the armature windings 5a and 5b.

In the conventional direct current motor shown in FIG. 1, magnetic flux $\phi_1$ and $\phi_2$, of the magnetic field caused by the armature reaction which is induced by the entire electric current flowing within the armature windings 5, form a circulating passage which passes through the interpole 19, the armature 3, the interpole 21 and the yoke 27, and reaches the interpoles 19 again. The direction of the magnetic flux $\phi_1$ and $\phi_2$ is opposite to that of the magnetic flux generated by the interpoles 19 and 21. Therefore, the interpoles 19 and 21 must have: (A) a magnetomotive force which can eliminate the magnetic flux $\phi_1$ and $\phi_2$, and; (B) a compensating magnetomotive force which can eliminate the counter electromotive force induced in the armature windings 5. Thus, there is a need for a large cross sectional area of the interpole windings 23 and 25.

EMBODIMENT OF THE PRESENT INVENTION

Figure 2:
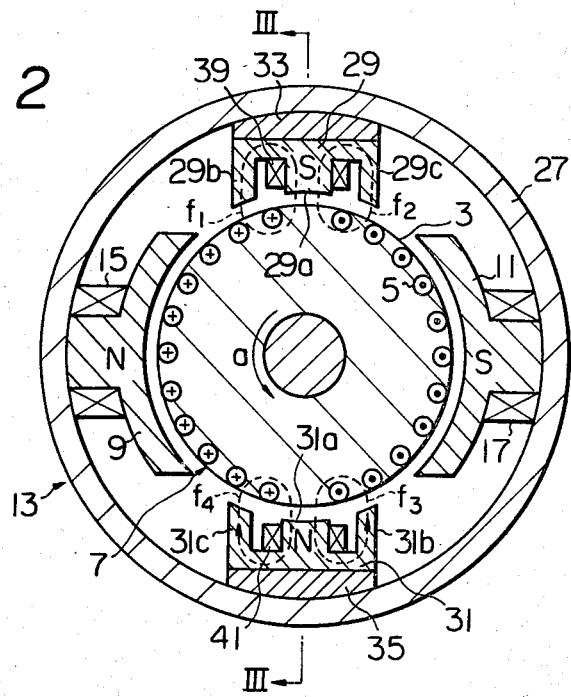
FIG. 2 is a cross sectioned elevational view which illustrates a direct current motor according to the present invention.
Figure 3:
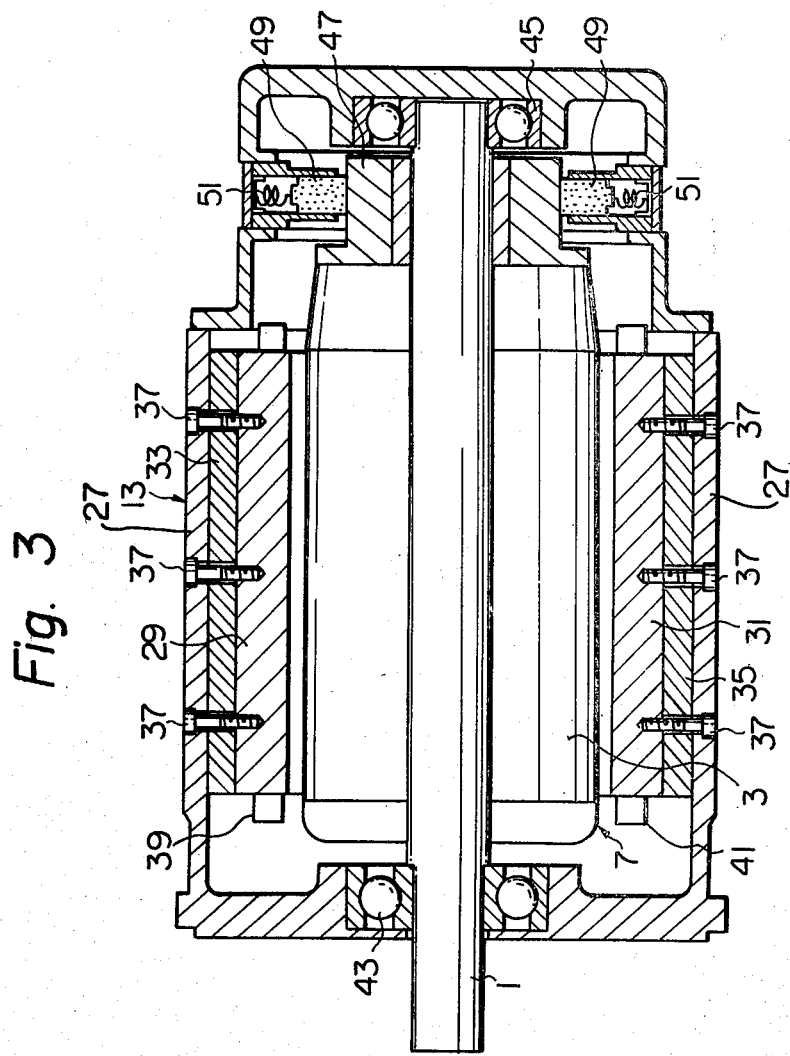
FIG. 3 is a sectional view sectioned along the line III—III in FIG. 2.

With reference to the accompanying FIGS. 2 and 3, a direct current motor according to the present invention will be explained hereinafter. The same parts appearing in FIGS. 2 and 3 as appear in FIG. 1 are designated by the same reference numerals and an explanation therefor is ommited herein. Referring to FIGS. 2 and 3, interpoles 29 and 31 are fastened to the inside of a yoke 27 via bolts 37 (FIG. 3), and spacers 33 and 35 of a non-magnetic material, such as aluminium, are inserted between the yoke 27 and the interpoles 29 and 31, respectively.

As shown in FIG. 2, the interpole 29 comprises a main small pole 29a positioned at a central position, a first auxiliary small pole 29b positioned at a leading position of the main small pole 29a with regard to the rotating direction of the armature 3, and a second auxiliary small pole 29c positioned at a trailing position of the main small pole 29a with regard to the rotating direction of the armature 3. The main small pole 29a, the first auxiliary small pole 29b and the second auxiliary small pole 29c are positioned so as to face the surface of the armature 3 with a small air gap therebetween. The main small pole 29a has interpole windings 39 wound thereon so that, when the armature 3 is rotated in a direction shown by an arrow a, the main small pole 29a is electromagnetically motivated to a predetermined polarity S which is opposite to that of the main magnetic pole 9 positioned at a leading position of the main small pole 29a with regard to the rotating direction of the armature 3. The polarity of the auxiliary small poles 29b and 29c become N, which is opposite to that of the main small pole 29a.

The interpole 31 also comprises a main small pole 31a and first and second auxiliary small poles 31b and 31c, respectively. The main small pole 31a also has interpole windings 41 wound thereon so that, when the armature 3 is rotated in a direction shown by the arrow a, the polarity of the main small pole 31a becomes N and the polarity of the auxiliary small poles 31b and 31c becomes S. The electromagnet motive force of the interpoles 29 and 31 can be varied in accordance with changes in armature current by changing the current supply into the windings 39 and 41.

According to the present invention, the magnetic field which is caused by the armature reaction and which activates the interpoles 29, 31 can be decreased for the reason set forth below. The magnetic flux $\phi_1$ and $\phi_2$, which was generated in the conventional direct current motor shown in FIG. 1, is now prevented from penetration into the yoke 27 of the direct current motor according to the present invention due to the existence of the spacers of non-magnetic material 33 and 35. Therefore, the magnetic flux $\phi_1$ and $\phi_2$ can not form circulating passages which pass through the interpoles 29 and 31, the armature 3 and the yoke 27, respectively. Only magnetic flux $f_1$ and $f_3$ can pass through the main small poles 29a and 31a, the armature 3 and the first auxiliary small poles 29b and 31b, respectively, to form circulating passages, respectively. In similar fashion, only magnetic flux $f_2$ and $f_4$ can pass through the second auxiliary small poles 29c and 31c, the armature 3 and the main small poles 29a and 31b, respectively, to form circulating passages, respectively. Therefore, the interpoles 29 and 31 must only have:

(A) a magnetomotive force which can eliminate the magnetic flux $f_1$, $f_2$, $f_3$ and $f_4$ passing through the small circulating passages and which is thus a much smaller force than for the magnetic flux $\phi_1$ and $\phi_2$, and;

(B) a compensating magnetomotive force which can eliminate the counter electromotive force induced in the armature windings.

The amount of the magnetomotive force of the interpoles 29 and 31 disposed in the direct current motor according to the present invention is much smaller than that of the interpoles 19 and 21 disposed in the conventional direct current motor shown in FIG. 1. As a result, the direct current motor according to the present invention, one example of which is shown in FIGS. 2 and 3, can be constructed with interpole windings 39 and 41 which have a very small cross sectional area and with interpoles 29 and 31 which are compact in size. The heat generated by the motor accordingly can be reduced and the operating characteristics of the motor can be maintained at a high level.

In FIG. 3, a rotatable shaft 1 is rotatably supported via bearings 43 and 45 an armature 3 and a commutator 47 are fixed to the rotatable shaft 1, and brushes 49 are urged toward the commutator 47 via springs 51.

According to the present invention, the spacers 33 and 35 of non-magnetic material, which are used to magnetically insulate the interpoles from the yoke 27, can be replaced by an air gap located between the interpoles 29 and 31 and the yoke 27. It will be apparent to those skilled in the art that the direct current motor according to the present invention is not limited to the embodiment illustrated in the attached drawings and that modifications and variations can be changed made in the motor without departing from the scope of invention. For example, the number of the main magnetic poles can be increased to four or the more.

What we claim is:

1. A direct current motor comprising a yoke, a plurality of main magnetic poles disposed in a predetermined direction on said yoke with a predetermined pitch between adjacent main magnetic poles, wherein the polarities of adjacent poles are different from each other, an armature having armature windings wound thereon, actuated by an electromagnetomotive force caused by said magnetic poles and moved along said predetermined direction in which said main magnetic poles are disposed, and interpoles disposed at positions located between said adjacent main magnetic poles and facing said armature windings located within a commutating zone, wherein each of said interpoles comprises an E-shaped three-pole structure disposed on said yoke in said predetermined direction, and spacers of non-magnetic material disposed between said yoke and said interpoles, whereby two magnetic circuits are formed between adjacent poles of each interpole and said armature.

2. The direct current motor of claim 1, wherein said interpoles have an electromagnetomotive force variable in accordance with changes in armature current.

3. The direct current motor of claim 1, wherein said spacer is formed of a non-magnetic metal material.

4. A direct current motor comprising a yoke having a circular shape, a plurality of main magnetic poles disposed inside of said yoke with a predetermined pitch between adjacent main magnetic poles, wherein the polarities of adjacent poles are different from each other, an armature having armature windings wound thereon, actuated by an electromagnetomotive force caused by said main magnetic poles and rotated along a predetermined direction in which said main magnetic poles are disposed, and interpoles disposed at positions located between said adjacent main magnetic poles and facing said armature windings located within a commutating zone, wherein each of said interpoles comprises an E-shaped three-pole structure disposed inside of said yoke along said predetermined direction, and spacers of non-magnetic material disposed inside between said yoke and said interpoles, whereby two magnetic circuits are formed between adjacent poles of each interpole and said armature.

5. A direct current motor according to claim 4, wherein the E-shaped three-pole structure of each interpole comprises a main center small pole and two auxiliary small poles, the polarities of said auxiliary small poles being different from the polarity of said main small pole and the polarity of each main small pole being different from that main magnetic pole located at a leading position with regard to the rotating direction of said armature, and wherein one of said auxiliary small poles for each interpole is disposed at a position inside of said yoke located at a leading position with regard to the rotating direction of said armature, whereby said two magnetic circuits have directions different from each other and are formed between one of said auxiliary small poles of each interpole, said main small pole of the respective interpole and said armature.

6. A direct current motor according to claim 5, wherein said main small poles have windings wound thereon for electromagnetically motivating said interpoles, whereby the electromagnetomotive force can be varied in accordance with changes in armature current.

* * * * *

UNITED STATES PATENT AND TRADEMARK OFFICE
CERTIFICATE OF CORRECTION

PATENT NO. : 4,220,882

DATED : September 2, 1980

INVENTOR(S) : Yoshinori Kohzai et al.

It is certified that error appears in the above-identified patent and that said Letters Patent are hereby corrected as shown below:

```
Column 1, line 43, "," should be --;--;
Column 1, line 44, delete ";".
Column 2, line 29, ", and;" should be --; and--.
Column 3, line 18, ", and;" should be --; and--;
Column 3, line 33, "aluminium" should be --aluminum--.
Column 4, line 3, "29, 31" should be --29 and 31--;
Column 4, line 10, "can not" should be --cannot--;
Column 4, line 25, "," should be --;--;
Column 4, line 26, delete ";";
Column 4, line 55, delete "changed";
Column 4, line 56, after "of" insert --the--;
Column 4, line 58, delete "the".
```

Signed and Sealed this

Third Day of March 1981

[SEAL]

Attest:

RENE D. TEGTMEYER

Attesting Officer

Acting Commissioner of Patents and Trademarks